(No Model.) 2 Sheets—Sheet 1.
G. H. DERBY.
FINISHING MACHINE.
No. 559,166. Patented Apr. 28, 1896.
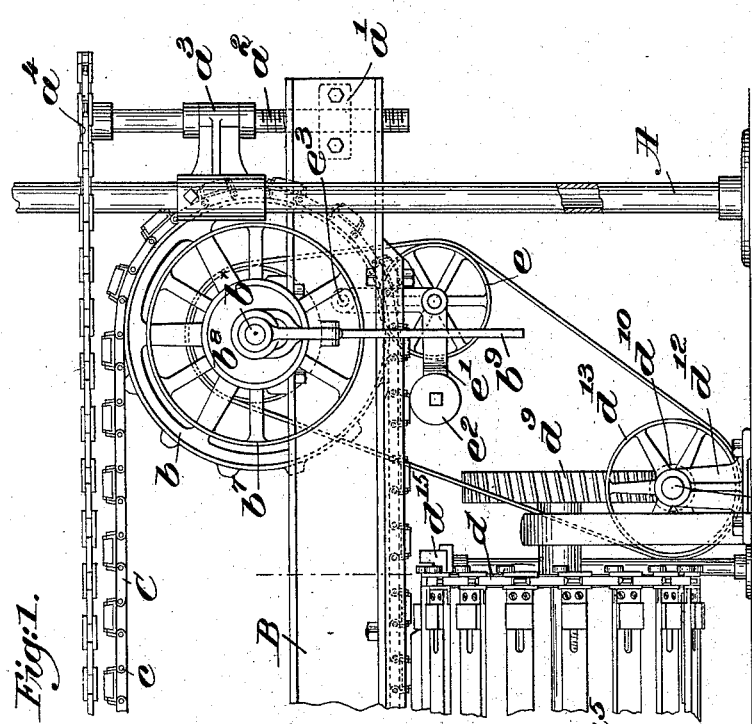
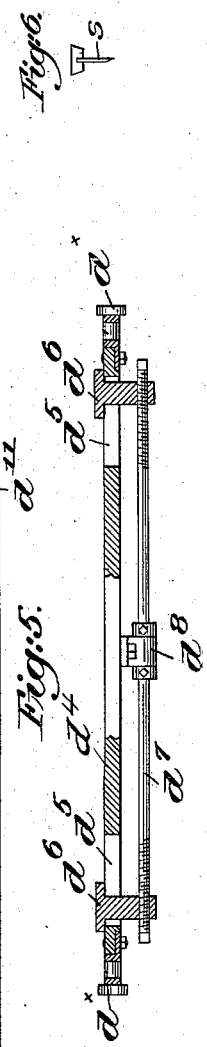
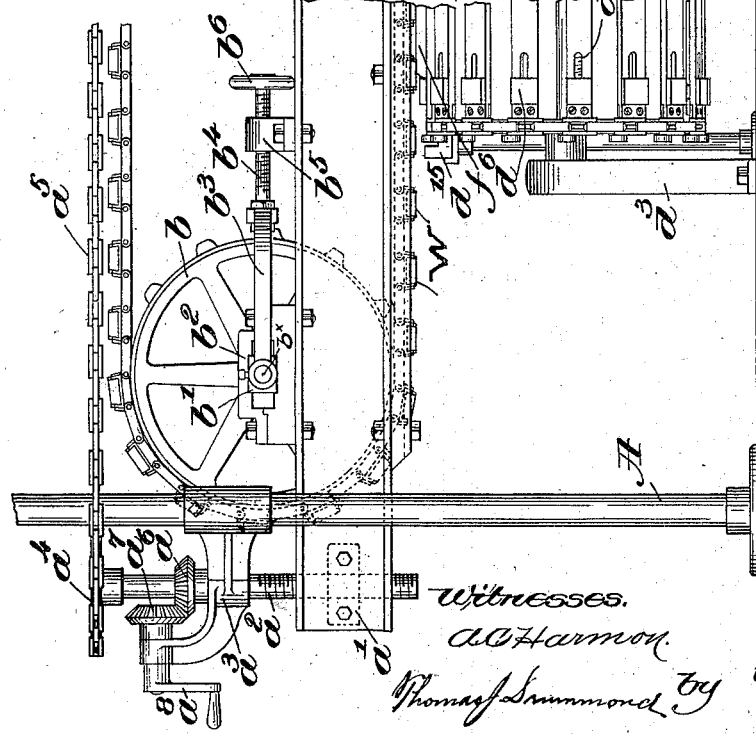
Witnesses.
A. C. Harmon.
Thomas J. Drummond
Inventor.
George H. Derby
by Crosby & Gregory
attys

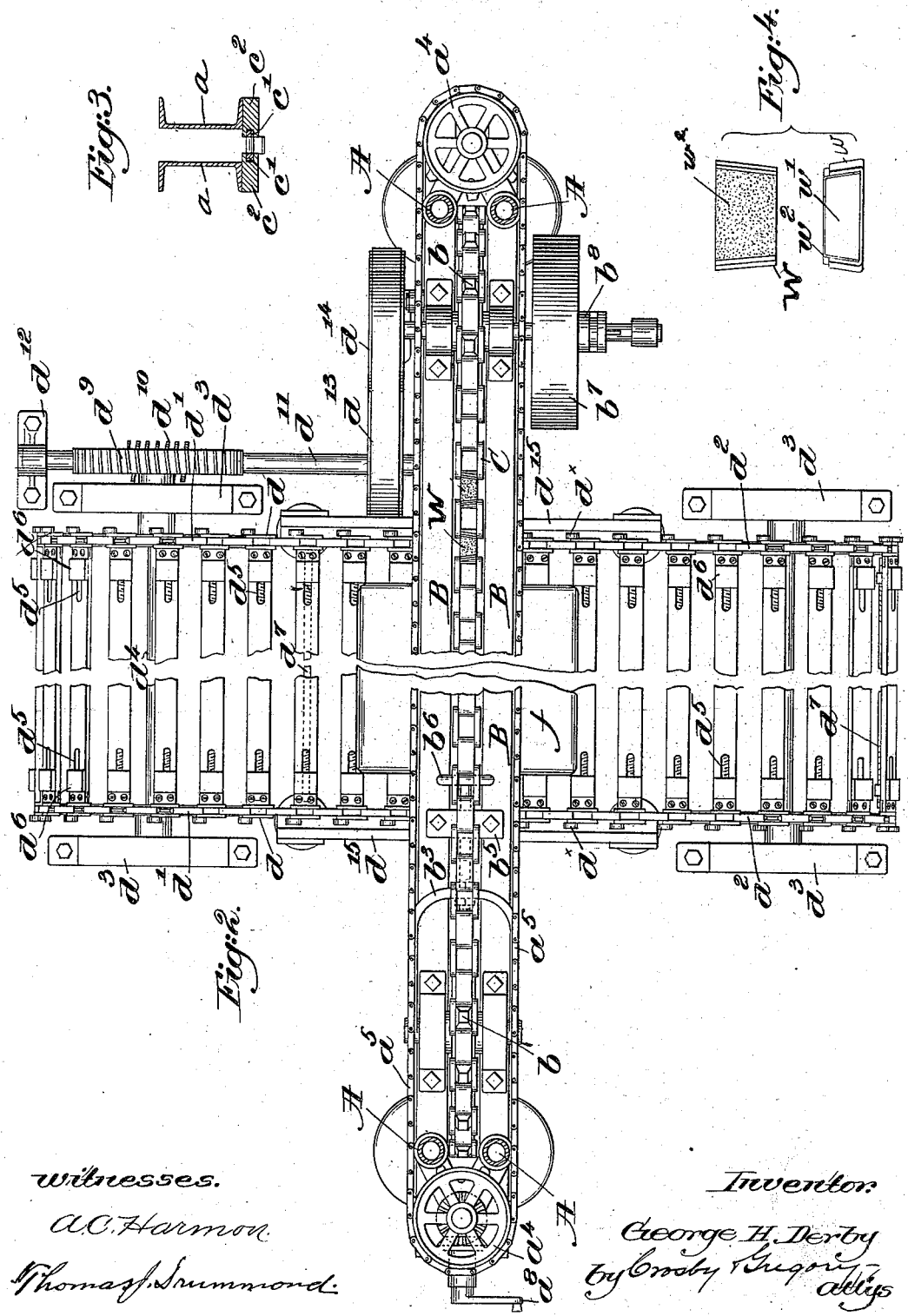

UNITED STATES PATENT OFFICE.

GEORGE H. DERBY, OF SOMERVILLE, MASSACHUSETTS.

FINISHING-MACHINE.

SPECIFICATION forming part of Letters Patent No. 559,166, dated April 28, 1896.

Application filed March 11, 1895. Serial No. 541,218. (No model.)

*To all whom it may concern:*

Be it known that I, GEORGE H. DERBY, of Somerville, county of Middlesex, State of Massachusetts, have invented an Improvement in Finishing-Machines, of which the following description, in connection with the accompanying drawings, is a specification, like letters on the drawings representing like parts.

This invention has for its object to provide and improve a machine for sandpapering, polishing, or otherwise finishing or working desk-tops and other surfaces.

In accordance with my invention the working devices are mounted upon an endless carrier, preferably a sprocket-chain, carried about suitable rotating wheels or pulleys, the table or desk top or other article to be finished or worked being carried by a suitable work-support, arranged in such relation to the traveling carrier with its attached working devices that the latter in their movements will act in desired manner upon the said desk-top or article to be finished or worked.

An important feature of my invention is a guide to catch the working devices as they approach the article to be finished and guide the same in their passage across the said article to insure accuracy in the line of travel, whereby a uniform finished surface is produced.

My invention also comprehends an endless work-support, traveling at right angles to the direction of travel of the working device.

Other features of my invention will be hereinafter described, and pointed out in the claims.

In the drawings, Figure 1 is a side elevation, partially broken out at its middle, of a machine embodying my invention; Fig. 2, a top or plan view of the machine shown in Fig. 1, the figure being also broken out at its middle. Fig. 3 is a sectional detail showing one construction of frame; Fig. 4, under side and detail views, respectively, of a holder for sandpaper or other working material; Fig. 5, a sectional detail through one of the slats or bars of the endless work-support to better show the means for attaching the article to be finished to the said support, and Fig. 6 a detail showing a modified form of working device.

In the embodiment of my invention selected as an illustration and shown in the drawings, A A are suitable (herein shown as tubular) standards, preferably four in number, adapted to receive between them the vertically-adjustable frame B, girder-like in form, and shown as composed of two channel-bars $a$ $a$, arranged back to back and separated a sufficient distance to permit travel between the same of the endless carrier and its working devices.

At their opposite ends the channel-bars $a$ $a$, constituting two members of the frame, are joined by suitable castings $a'$ $a'$, (shown in dotted lines, Fig. 1,) in which are threaded the screws $a^2$, held at their upper ends and journaled in suitable brackets $a^3$ on the vertical standards A A, said brackets being preferably secured in position by suitable set-screws to enable their vertical position to be varied.

The screws $a^2$ are shown as extended above their respective brackets and provided at their upper ends with sprocket-wheels $a^4$, connected by a suitable sprocket-chain $a^5$, constituting one form of connection between, and whereby both screws may be simultaneously rotated for adjustment.

One of the screws $a^2$ (herein shown as that at the left, Fig. 1) is provided with a beveled gear-wheel $a^6$, in mesh with and driven by a beveled wheel $a^7$, on a short shaft journaled in an arm of the bracket and provided with an adjusting-handle $a^8$, by means of which both screws may be rotated to cause vertical adjustment of the frame B.

Upon the frame B are mounted suitable bearings for the shafts $b^\times$ of two wheels $b$ $b$, the bearings for one of the wheels (herein shown as that at the right, Fig. 1) being rigid and of usual construction. The bearings $b'$ for the other wheel (that at the left, Fig. 1) are herein shown as horizontally adjustable in suitable pillow-blocks $b^2$ mounted upon the frame, and the said bearings $b'$ at opposite sides the wheel $b$ are shown as joined by a yoke $b^3$, to which is loosely connected an adjusting-screw $b^4$, threaded in a bridge-block $b^5$ and provided with an operating-wheel $b^6$, by means of which the screw may be rotated for horizontal adjustment of the bearings $b'$. About these wheels $b$ is passed an endless carrier C, (shown as a sprocket-chain,) to accommodate which the wheels $b$ are preferably made as sprocket-wheels, and upon the links of the carrier are mounted at proper intervals the desired working devices indicated at W.

In the particular embodiment of my invention herein shown the working devices W consist each in an open-sided socket $w$, which is made tapering and wedge-shaped both in horizontal and face view, as at the top, Fig. 4, and in end view, as at the bottom, Fig. 4, the said socket receiving a block $w'$, between which and the socket, when the block is placed in position, is wedged the material $w^2$, which is to act upon the article to be finished, the said material in the instance shown being sandpaper.

By making the socket and block wedge-shaped both in cross-section and in the direction of their length—*i. e.*, in the direction in which the block is passed into the socket—the latter not only holds the block in position, but at the same time holds the material or sandpaper $w^2$ also tightly in position, covering the block.

Referring now particularly to Figs. 1 to 3, the pivot-pins $c$ of the chain C are shown as extended at their ends laterally beyond the sides of the chain to form guides $c'$ for the working devices adapted to travel in a suitable guiding-groove in the guide-strips $c^2$. (Shown as secured to the under side of the frame members $a\ a$.)

To drive the carrier C and working devices W, I have provided the shaft of one of the wheels $b$ (herein shown as that at the right, Fig. 1) with a driving-pulley $b^7$, which is connected with its shaft by a suitable clutch device $b^8$ of any suitable construction. (Shown as under the control of a clutch-lever $b^9$.)

The work-support is arranged beneath the frame B, and in the present instance of my invention is shown as an endless traveling support, consisting of two parallel sprocket-chains $d\ d$, arranged at right angles to the line of travel of the carrier C and at their opposite ends passed, respectively, about like sprocket-wheels $d'\ d'$ and $d^2\ d^2$, mounted upon suitable shafts journaled in bearings $d^3$. (Shown as sustained upon the floor or foundation.) These sprocket-chains $d\ d$ are shown as connected at regular intervals by the cross bars or slats $d^4$, (shown as provided at their ends with slots $d^5$,) which receive the shanks of the clamping-blocks $d^6$, which are thereby adjustable toward and from each other in the said slots, the said shanks on each bar or slat being at their lower ends threaded to receive the threaded clamping-shaft $d^7$, (see Fig. 5,) held at its center against longitudinal movement by a fork $d^8$ on the slat and squared or otherwise formed at its ends to receive a suitable adjusting key or wrench by which it may be rotated for adjustment of the clamping-blocks.

In the construction shown the adjusting-shafts $d^7$ are right and left threaded, so that rotation of the same in either direction will cause opposite movement of the clamping-blocks applied thereto.

In the present instance the shaft on which the sprocket-wheels $d'$ is mounted is provided at one of its ends, outside its end bearing, with a worm-wheel $d^9$, driven by a worm $d^{10}$ on a shaft $d^{11}$, journaled in suitable bearings $d^{12}$, and having fast upon it a pulley $d^{13}$, belted to a pulley $d^{14}$ on the main or driving shaft $b^\times$ of the machine on which the driving-pulley $b^7$ is mounted, so that rotation of the driving-pulley when coupled to its shaft will not only drive the endless carrier C, but will also drive, but at a much slower speed, the endless carrier or work-support described.

In use the desk-top or other article to be finished or worked will be clamped upon the traveling work-support, as shown at $f$, Fig. 1, by means of the clamping-blocks thereon, which are pressed against and preferably overlap the usual rounded edges of the desk-top or other article and the machine set in motion, the traveling work-support causing the article carried thereby to be slowly fed beneath the frame B to be acted upon in succession by the working devices W, the degree of pressure or force with which the said working devices act upon the article on the work-support being varied by vertical adjustment of the frame B by means of the handle $a^8$ described.

To take up the slack in the belt connecting the worm-shaft with the driving-shaft I have herein shown a slack-adjusting pulley $e$, journaled at the apex of a bell-crank or elbow lever $e'$, weighted at $e^2$ and fulcrumed at $e^3$, the action of the weighted end of the lever pushing the pulley to one side to keep the belt always taut.

To support the sprocket-chains $d'$ and their slats $d^4$ in proper position during the finishing or working operation, I have provided the said sprocket-chains with suitable side rollers $d^\times$, preferably journaled upon the projecting ends of the pivot-pins uniting the links of the chains and which are adapted to travel upon or in suitable guides $d^{15}$.

The particular article to be finished or worked in the machine shown is necessarily moved in a true rectilinear line of travel by reason of the guides $d^{15}$, and the working devices W are likewise caused to travel in a similar line, but at right angles thereto, by reason of the guide-strips $c^2$. Hence an accurately finished or worked surface is insured.

It is necessary to use the guides $c^2$ or their equivalents in order to prevent the working devices forming thick and thin places in the finished surface, and it is likewise necessary, when the endless work-support is used, to provide guides $d^{15}$ or their equivalents to insure correct movement of the article to be finished.

In the practical use of the machine shown the desk-tops or articles may be placed upon the traveling work-support and removed therefrom without requiring the machine to be stopped, and, if desired, the same work-support may extend beneath several frames B with their endless carriers and working devices to cause the same desk-top or article to be acted upon successively by what are in effect several distinct machines.

The guiding-surfaces for the working devices may be changed in shape to correspond with the curvature of any desired surface to be worked.

While my invention is particularly useful in connection with sandpapering-machines, yet in place of the sandpaper I may use any other device or material for otherwise acting upon and to assist in working or finishing the surface of the desk-tops or other articles.

In Fig. 6 a different working device is shown, it consisting of a scraper-blade s, of which any number may be attached to the endless carrier.

My invention is not limited to the particular construction herein shown, for it is evident that the same may be varied without departing from the spirit and scope of the invention.

I claim—

1. In a machine of the class described, a work-support, a frame, a plurality of working devices, an endless traveling carrier therefor, wheels over which the said carrier is passed, and a guide adjacent said work-support and acting upon said working devices from the sides of the latter, also adjacent said work-support, to accurately fix the line of travel of said working devices and prevent the same, when in motion, moving toward said work-support to cause depressions or inequalities in the surface operated upon, substantially as described.

2. A machine of the class described containing the following instrumentalities, viz: a work-support, two wheels, an endless carrier passed about the same, guiding devices projecting laterally beyond the edges of the said carrier, and a guide between the wheel-axes and work-support to catch and act from above and below upon the projecting ends of the said guiding devices to support the carrier in its travel against lateral movement toward or from said work-support and working devices on the said endless carrier, substantially as described.

3. In a machine of the class described, the combination with a work-support, and a frame vertically adjustable, of a series of working devices, an endless carrier therefor, wheels for said carrier journaled in bearings on the said frame, and adjusting devices for the frame, to vary the position of the line of travel of the said working devices relatively to said work-support, substantially as described.

4. In a machine of the class described, the combination with a work-support, and a frame vertically adjustable, of a series of working devices, an endless carrier therefor, wheels for said carrier journaled in bearings on the said frame, and means for simultaneously adjusting both ends of the said frame to vary the position of the line of travel of the moving working devices without changing the alinement of the same, substantially as described.

5. In a machine of the class described, the combination with an endless carrier, a plurality of working devices mounted thereon, and a rigid guide to hold said working devices to travel in an unvarying straight line of work, of an endless traveling work-support, and a plurality of wheels over which it is passed, substantially as described.

6. In a machine of the class described, the combination with an endless carrier, a plurality of working devices mounted thereon, and a rigid guide to hold said working devices to travel in an unvarying straight line of work, of an endless traveling work-support, a plurality of wheels over which it is passed, whereby a part of its movement is in a plane, and clamping devices on said work-support to secure the article to be finished in position, substantially as described.

7. In a machine of the class described, the combination with an endless traveling carrier, and a plurality of working devices mounted thereon, of an endless traveling work-support, moving at right angles to the direction of travel of said working devices, and guides to support the said work-support during operation of the working devices upon the article carried by the said support, substantially as described.

8. In a machine of the class described, an endless carrier, a series of working devices carried by said carrier, a guide coöperating with said working devices to hold them in a straight line of work, unyielding in any lateral direction, combined with a work-support, and means to move the same at an angle to the line of travel of said working devices, substantially as described.

9. In a machine of the class described, a plurality of working devices, an endless traveling carrier therefor, and means for adjusting said carrier vertically and horizontally, substantially as described.

10. In a machine of the class described, the combination with a plurality of working devices, and an endless traveling carrier therefor, of an endless work-support traveling at an angle to said carrier, and having its upper surface in an extended plane parallel to said working devices, and a fixed guide to maintain said work-support unyieldingly in its plane position, substantially as described.

In testimony whereof I have signed my name to this specification in the presence of two subscribing witnesses.

GEORGE H. DERBY.

Witnesses:
FREDERICK L. EMERY,
MARGARET A. DUNN.